US010452496B2

(12) United States Patent
Gupta et al.

(10) Patent No.: US 10,452,496 B2
(45) Date of Patent: Oct. 22, 2019

(54) SYSTEM AND METHOD FOR MANAGING STORAGE TRANSACTION REQUESTS

(71) Applicant: VMware, Inc., Palo Alto, CA (US)

(72) Inventors: Abhishek Gupta, Sunnyvale, CA (US); Richard P. Spillane, Mountain View, CA (US); Kapil Chowksey, Palo Alto, CA (US); Rob Johnson, Palo Alto, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/727,211

(22) Filed: Oct. 6, 2017

(65) Prior Publication Data

US 2019/0108104 A1 Apr. 11, 2019

(51) Int. Cl.
*G06F 11/14* (2006.01)
*G06F 16/23* (2019.01)

(52) U.S. Cl.
CPC ...... *G06F 11/1471* (2013.01); *G06F 16/2358* (2019.01); *G06F 11/1474* (2013.01); *G06F 2201/825* (2013.01); *G06F 2201/87* (2013.01)

(58) Field of Classification Search
CPC ............ G06F 11/1471; G06F 11/1474; G06F 17/30368; G06F 2201/825; G06F 2201/87
See application file for complete search history.

(56) References Cited

U.S. PATENT DOCUMENTS

| | | | | |
|---|---|---|---|---|
| 6,668,304 B1* | 12/2003 | Satran | ................. | G06F 11/1474 709/231 |
| 9,021,303 B1* | 4/2015 | DeSouter | ............ | G06F 11/1417 714/15 |
| 2010/0280996 A1* | 11/2010 | Gross, IV | ........... | G06F 11/1451 707/649 |
| 2011/0313973 A1* | 12/2011 | Srivas | ............... | G06F 17/30194 707/634 |
| 2012/0117421 A1* | 5/2012 | Craft | .................. | G06F 11/1471 714/15 |
| 2014/0244601 A1* | 8/2014 | Xie | ........................ | G06F 16/162 707/692 |
| 2017/0031933 A1* | 2/2017 | Xie | .................... | G06F 17/30079 |

* cited by examiner

*Primary Examiner* — Masud K Khan
(74) *Attorney, Agent, or Firm* — Loza & Loza, LLP

(57) ABSTRACT

Data storage system and method for managing transaction requests to the data storage system utilizes a write ahead log to write transaction requests received at the data storage system during a current checkpoint generation. After the transaction requests in the write ahead log are applied to a copy-on-write (COW) storage data structure stored in a storage system, one of first and second allocation bitmaps is updated to reflect changes in the COW storage data structure with respect to allocation of storage space in the storage system, and one of first and second super blocks is updated with references to central nodes of the COW storage data structure. After the allocation bitmap and the super block have been updated, an end indicator for the current checkpoint generation is written in the write ahead log to indicate that processing of the transaction requests for the current checkpoint generation has been completed.

20 Claims, 13 Drawing Sheets

SYSTEM AND METHOD FOR MANAGING STORAGE TRANSACTION REQUESTS

BACKGROUND

A key-value (KV) store or database is the simplest type of non-relational databases. As its name implies, a key-value store uses unique keys to find associated values. These unique keys and values are stored as key-value pairs. For a large KV store, an on-disk storage data structure that supports efficient create, read (lookup), update, delete, and range scans operations, such as a B-tree, is typically used to store the key-value pairs.

Various data storage systems have been developed to manage operations on such on-disk data structure so that the operations can be executed with atomicity and durability. One technique to manage operations on an on-disk data structure for KV store is the use of a physical log stored on-disk. In this technique, any change to the on-disk data structure due to an executed operation is recorded in the physical log. However, the use of a physical log requires repeated write operations, which are resource intensive and time consuming. In addition, the technique typically requires complex processes to ensure atomicity and durability.

BRIEF DESCRIPTION OF THE DRAWINGS

Throughout the description, similar reference numbers may be used to identify similar elements.

DETAILED DESCRIPTION

Figure 1:
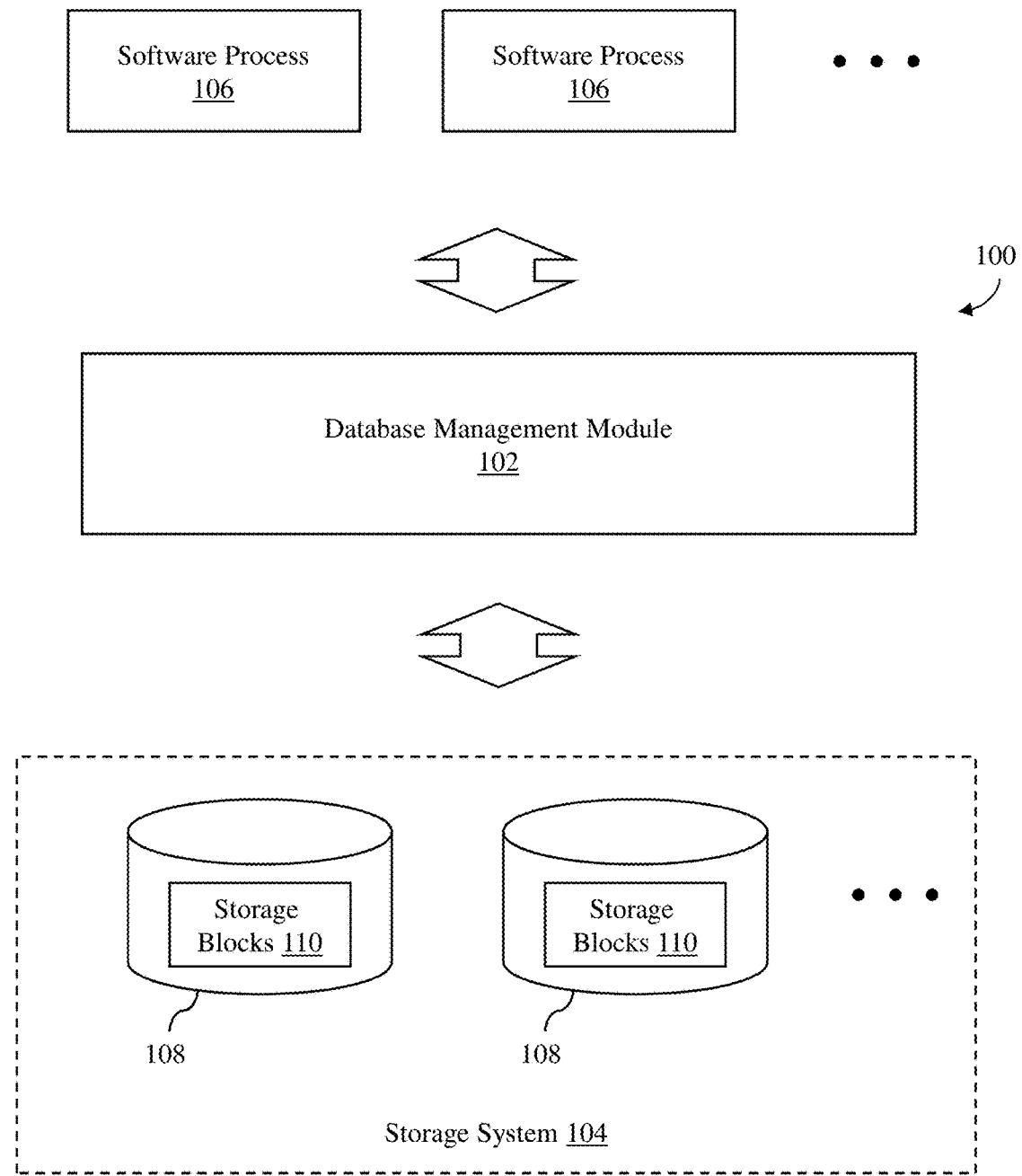
FIG. 1 is a block diagram of a data storage system in accordance with an embodiment of the invention.

FIG. 1 depicts a data storage system 100 in accordance with an embodiment of the invention. As shown in FIG. 1, the data storage system 100 includes a database management module 102 and a storage system 104. The data storage system 100 allows software processes 106 to perform data storage operations, such as writing, reading or deleting data stored in the storage system 104. The data stored in the data storage system 100 can be any type of data, including metadata of stored data. As described in detail below, the data storage system 100 is designed to execute these storage operations with durability and atomicity without the need for a physical log stored in the storage system 104.

The software processes 106 can any software program, applications or software routines that can run on one or more computer systems, which can be physical computers, virtual computers, such as VMware virtual machines, or a distributed computer system. The software processes 106 may initiate various data storage operations, such as read, write, delete and rename operations, for data stored in the storage system 104, which are then executed by the data storage system 100.

The storage system 104 of the data storage system 100 includes one or more computer data storage devices 108, which are used by the data storage system 100 to store data, which may include metadata. The data storage devices 108 can be any type of non-volatile storage devices that are commonly used for data storage. As an example, the data storage devices 108 may be, but not limited to, solid-state devices (SSDs), hard disks or a combination of the two. The storage space provided by the data storage devices 108 may be divided into storage blocks 110, which may be disk blocks, disk sectors or other storage device sectors.

In an embodiment, the storage system 104 may be a local storage system of a computer system supporting the database management module 102, such as a hard drive disk. In another embodiment, the storage system 104 may be a remote storage system that can be accessed via a network, such as a network-attached storage (NAS). In still another embodiment, the storage system 104 may be a distributed storage system such as a storage area network (SAN) or a virtual SAN. Depending on the embodiment, the storage system 104 may include other components commonly found in those types of storage systems, such as network adapters, storage drivers and/or storage management servers. The storage system 104 may be scalable, and thus, the number of data storage devices 108 included in the storage system can be changed as needed to increase or decrease the capacity of the storage system 104 to support increase/decrease in workload. Consequently, the exact number of data storage devices 108 included in the storage system 104 can vary from one to hundreds or more.

The database management module 102 operates to manage data and/or metadata stored in the storage system 104. As used herein, data stored in the storage system 104 may include any type of computer files, and metadata stored in the storage system may include information that describes the stored data with respect to its characteristics and physical storage locations. Thus, the metadata of stored data or "storage metadata" may include file names, file paths, modification dates and permissions. In a distributed file system architecture, the storage metadata may be stored in multiple metadata servers located at different storage locations.

In an embodiment, the database management module 102 may be implemented as software running on one or more computer systems, which can be physical computers, virtual computers, such as VMware virtual machines, or a distributed computer system. However, in other embodiments, the database management module 102 may be implemented in any combination of hardware and software.

If the database management module 102 is used for a file system, the database management module may present data stored in the storage system 104 as one or more file system structures, which include hierarchies of file system objects, such as file system volumes, file directories/folders, and files, for shared use of the storage system. Thus, the database management module 102 may organize the storage resources of the storage system 104 into the file system structures so that the software processes 106 can access the file system objects for various file system operations, such as creating file system objects, deleting file system objects, writing or storing file system objects, reading or retrieving file system objects and renaming file system objects.

Figure 2:
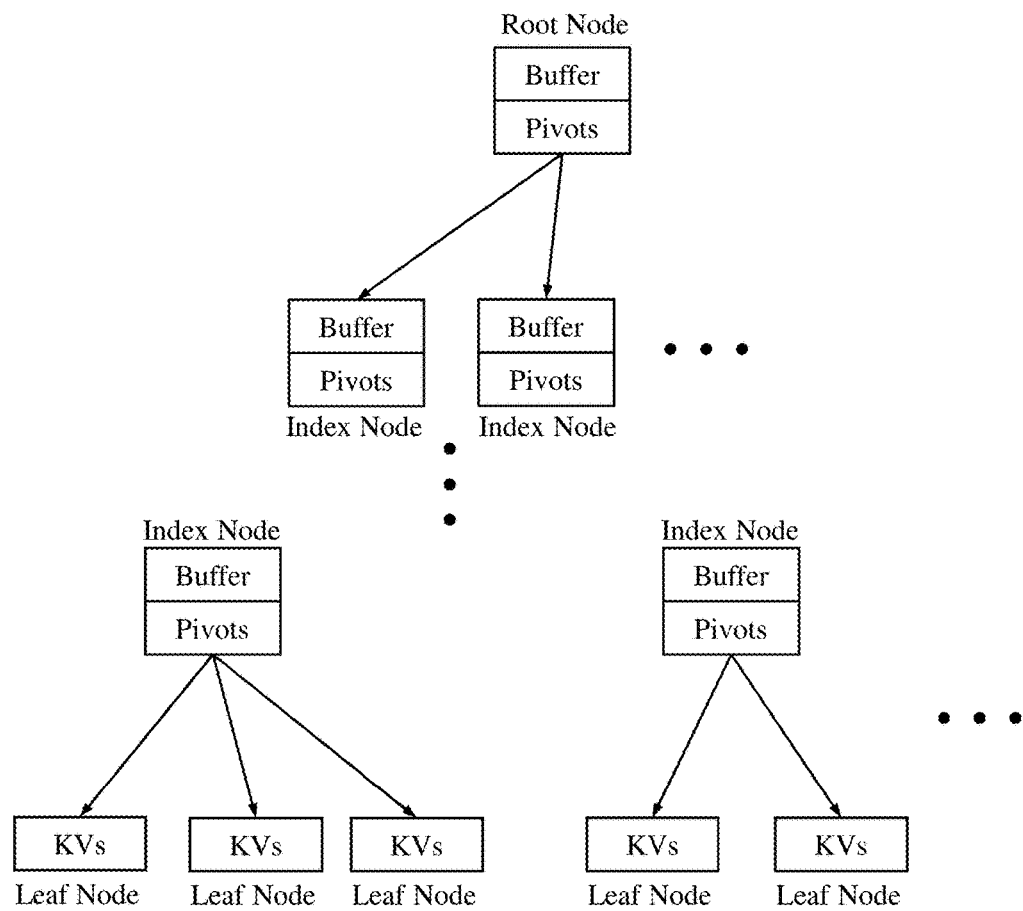
FIG. 2 is a diagram of a $B^\varepsilon$-tree used by the data storage system shown in FIG. 1 in accordance with an embodiment of the invention.

The database management module 102 stores data in a copy-on-write (COW) storage data structure, which may include multiple COW indexing data structures, such as COW B-trees. In an embodiment, the database management module 102 uses a storage data structure of multiple COW $B^\varepsilon$-trees. A COW $B^\varepsilon$-tree in accordance with an embodiment of the invention is illustrated in FIG. 2. As shown in FIG. 2, the COW $B^\varepsilon$-tree includes a root node, a number of internal or index nodes and a number of leaf nodes. Similar to B-trees, the root node of the $B^\varepsilon$-tree contains references or entries that point to index nodes in the form of pivot keys and child pointers (illustrated as "pivots" in FIG. 2). Each index node of the $B^\varepsilon$-tree also contains pivot keys and child pointers that point to other index nodes or leaf nodes. Each leaf node of the $B^\varepsilon$-tree contains key-value pairs stored in the storage system 104. Thus, a particular key-value pair can be found by locating the leaf node that contains that key-value pair using pointers in the root node and any index nodes that lead to that leaf node.

However, unlike B-trees, each of the root and index nodes of the $B^\varepsilon$-tree includes a buffer, which is used to store messages, which encode updates that will eventually be applied to key-value pairs in the leaf nodes under that internal node. As an example, insertions are encoded as "insert messages" addressed to specific keys and initially added to the buffer of the root node, which are flushed to one of the root node's children when sufficient number of messages have been added to the root node. The insert messages in the child node will be similarly flushed to other internal nodes, and eventually delivered to the appropriate leaf nodes. As another example, deletions are encoded as "tombstone messages" addressed to specific keys and initially added to the buffer of the root node. These tombstone messages are also flushed down to the appropriate leaf nodes. When a tombstone message is flushed to a leaf node, both the deleted key-value pair and the tombstone message are deleted.

The $B^\varepsilon$-tree is a copy-on-writeable data structure with modifications being made on copies of affected nodes. In some cases, the root node will be copied and modified, which means that the new root node would need to be referenced to access the latest state of the $B^\varepsilon$-tree.

Figure 3:
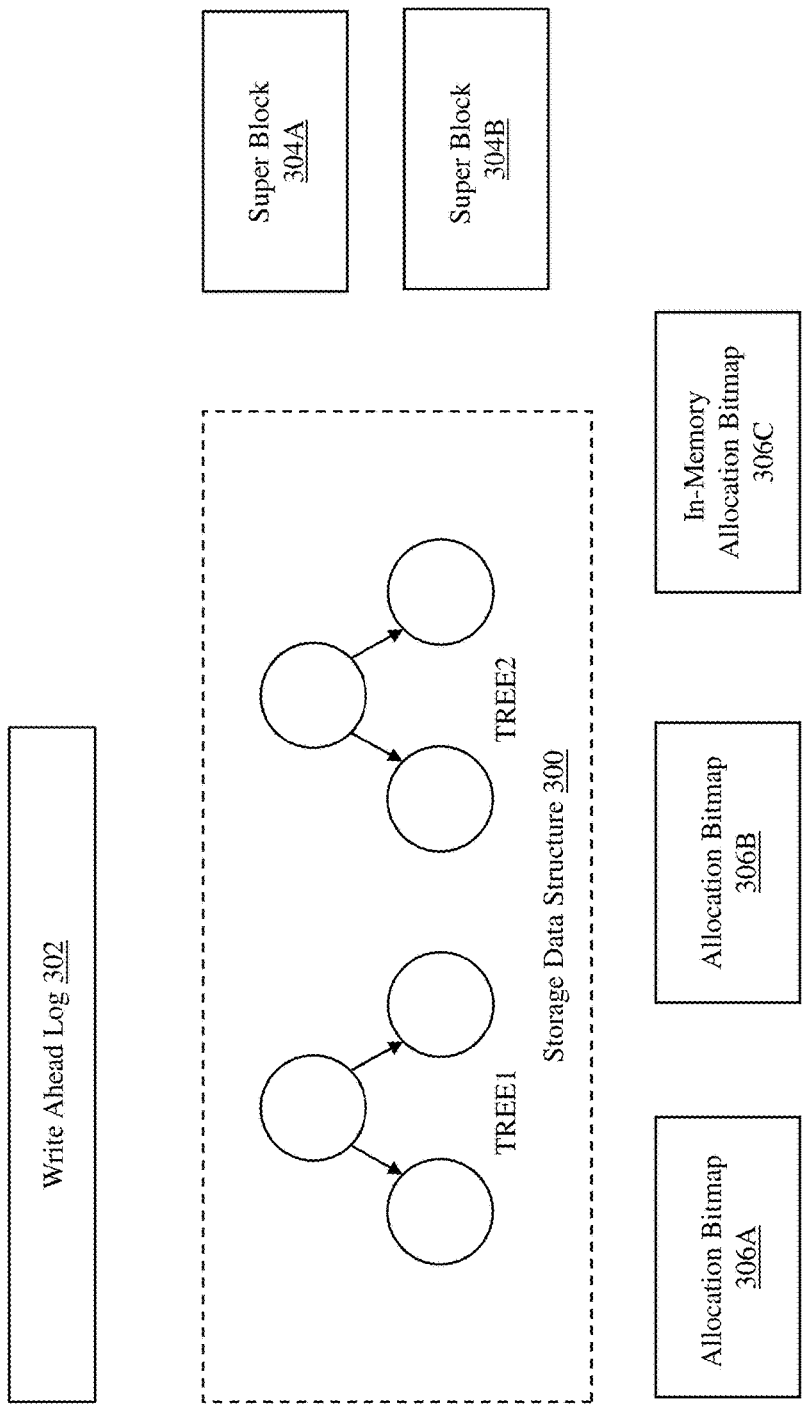
FIG. 3 is a block diagram of data structures used by the data storage system in accordance with an embodiment of the invention.

As illustrated in FIG. 3, in order to support operations on a storage data structure 300, the data storage system 100 uses a write ahead log 302 with a pair of super blocks 304A and 304B and multiple allocation bitmaps 306A, 306B and 306C. In the illustrated embodiment, the storage data structure 300 includes multiple COW $B^\varepsilon$-trees TREE1 and TREE2. Although the storage data structure 300 is shown with only two COW $B^\varepsilon$-trees in FIG. 3, the storage data structure may support many more COW $B^\varepsilon$-trees. In other embodiments, the storage data structure 300 may include other types of COW indexing data structures, such as COW B-trees. As explained in detail below, the database management module 102 manages the storage data structure using the write ahead log 302, the super blocks 304A and 304B and the allocation bitmaps 306A, 306B and 306C to ensure atomicity and durability with respect to processing data storage operations on the storage data structure 300.

The write ahead log 302 is a data structure that is used by the database management module 102 to maintain a log of individual transaction requests in the order that the transaction requests were received. Each transaction request may include at least a log number and the transaction type, e.g., insert and delete for data stored in the COW $B^\varepsilon$-trees of the storage data structure 300. In addition to transaction requests, the write ahead log 302 is also used to maintain checkpointing information to indicate the transaction requests that were received before and after certain checkpoints. Checkpointing is a process where data modifications corresponding to the transaction requests that were received after the previous checkpoint are executed on the storage system 104, e.g., written to one or more storage disks in the storage system. In one implementation, the checkpoint information is stored in the write ahead log 302 as generation start and end indicators. A particular checkpoint generation is defined by a generation start indicator and a corresponding generation end indicator. A generation end indicator is immediately followed by a new generation start indicator in the write ahead log. In an embodiment, each generation start or end indicator may include a generation identifier, which may be a numerical value, and an end or start indicator, which may be represented by a particular bit. The entries in the write ahead log 302 are persistently written to the storage system 104 so that previous transaction requests are not lost when a failure, such as a system crash, occurs.

The super blocks 304A and 304B are data structures that are used by the database management module 102 to record references to the storage data structure 300 at a particular state of the storage data structure when a particular checkpointing process was completed. Thus, using these references stored in the super blocks 304A and 304B, the storage data structure 300 at a desired state can be accessed for recovery after a failure. In some embodiments, the references recorded in the super blocks 304A and 304B are pointers to central or first nodes of indexing data structures of the storage data structure 300, which are stored with a checkpoint generation identifier. The checkpoint generation identifier, which may be a checkpoint generation number, indicates the checkpoint generation that was successfully completed. In embodiments where the indexing data structures are B-trees, the references may be references to the appropriate root nodes of the B-trees after completion of a particular checkpoint generation. The appropriate root nodes of the B-trees after completion of a particular checkpoint generation are the latest root nodes of the B-trees after completion of that checkpoint generation, which includes root nodes that were copied and modified due to the checkpointing process. In one implementation, the references to the root nodes of B-trees of the storage data structure 300 include storage offsets of where the root nodes are stored in the storage system 104. In some embodiments, the super blocks 304A and 304B may also include checksums to ensure validity of the information stored therein.

The super blocks 304A and 304B may store the references to the storage data structure 300 in any data structure configuration. As an example, the super blocks 304A and 304B may be configured as tree data structures, such as B-trees.

The super blocks 304A and 304B may be stored at different locations on the storage system 104 to reduce the possibility of losing both super blocks due to hardware and/or software failure. In an embodiment, one of the two super blocks 304A and 304B may be stored on one storage device 108 of the storage system 104 and the other super block may be stored on another storage device of the storage system. In other embodiments, one of the two super blocks may be stored at a first location of a storage device of the storage system 104, e.g., one sector of a storage disk, and the other super block may be stored at a second location of the same storage device, e.g., another sector of the same storage disk.

In operation, when current references to the storage data structure 300, including any new references, are needed to be recorded for a particular checkpoint generation, only one of two existing super blocks 304A and 304B is updated to record the references with a checkpoint generation identifier. The updated super block is then subsequently used to record current references to the storage data structure 300 with the next checkpoint generation identifier. In an embodiment, when current references to the storage data structure 300 are needed to be recorded for a particular checkpoint generation, one of the existing super blocks 304A and 304B at a first storage location in the storage system 104 is first copied and modified in memory with the references and the corresponding checkpoint generation identifier, and then the modified super block is placed in a second or alternate storage location in the storage system, replacing the previous super block at the alternate location with the modified super block. However, the super block at the first storage location in the storage system is not modified. When current references to the storage data structure 300 are needed to be recorded for the next checkpoint generation, the most recently updated super block, i.e., the super block at the second storage location, is used to update the super block at the first storage location. Thus, in this embodiment, the selection of a super block to be updated is successively switched between the two super blocks.

The allocation bitmaps 306A, 306B and 306C are data structures that are used to indicate whether units of storage spaces in the storage system 104 have been allocated or not allocated. A unit of storage space can be any predefined size of storage that can be used to store data, such as data for the storage data structure 300. As an example, a unit of storage space can be a storage block of 4096 bytes. A storage space unit is allocated if that storage space unit has been assigned to be written with data, which is typically represented by a "1" bit in an allocation bitmap. A storage space unit is not allocated if that storage space unit is available, or free to be assigned or allocated, which is typically represented by a "0" bit in an allocation bitmap.

As illustrated in FIG. 3, there are three allocation bitmaps 306A, 306B and 306C used in the data storage system 100 to manage allocation/availability of storage space units in the storage system 104. The two allocation bitmaps 306A and 306B are persistently stored in the storage system 104, e.g., on one or more storage disks, and the allocation bitmap 306C is stored in memory. The in-memory allocation bitmap 306C is used to mark or record the latest allocations, which is then used to update one of the two allocation bitmaps 306A and 306B stored in the storage system 104, which may be stored in different storage devices or storage sectors in the storage system. Thus, at least one of the two allocation bitmaps 306A and 306B stored in the storage system 104 is synchronized with the in-memory allocation bitmap 306C with the latest allocation information, which can be used in the event of crash or other failures.

Figure 4:
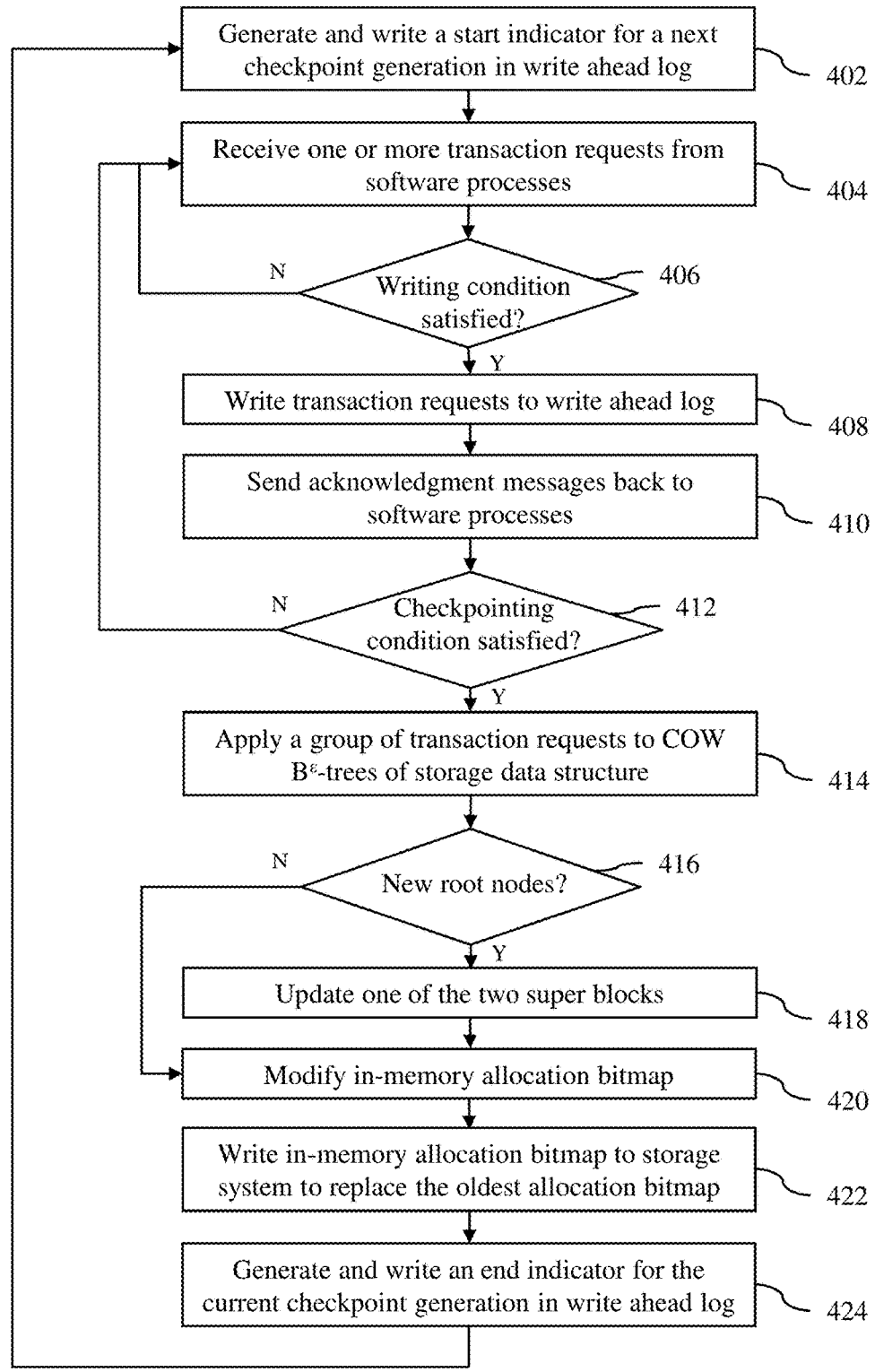
FIG. 4 is a process flow diagram of the transaction processing operation of the data storage system in accordance with an embodiment of the invention.
Figure 5A:
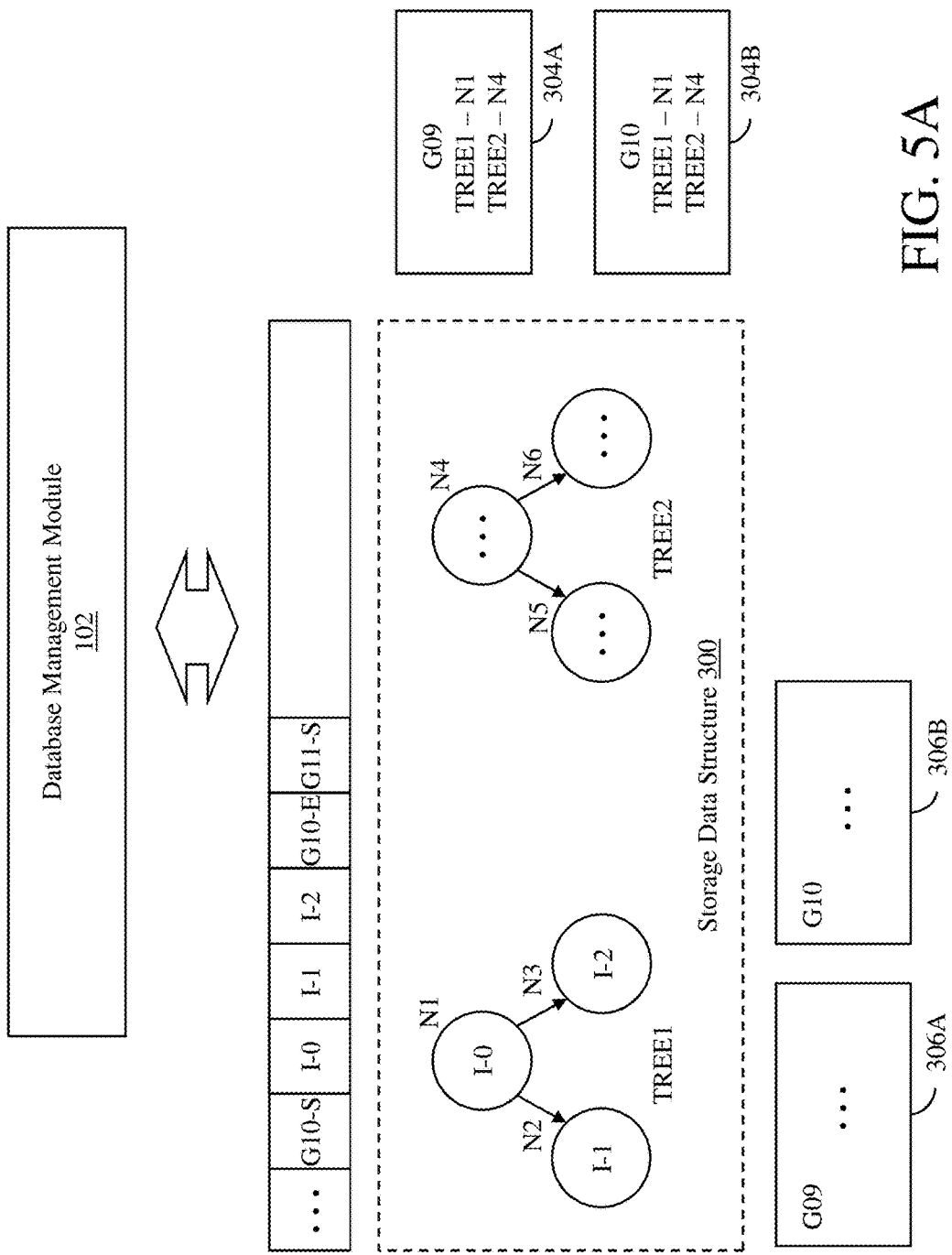
FIGS. 5A-5F show examples of data structures used by the data storage system at different times in accordance with an embodiment of the invention.

The transaction processing operation of the data storage system 100 in accordance with an embodiment of the invention will now be described with reference to a flow diagram of FIG. 4 using examples of data structures used by the data storage system at different times, which are shown in FIGS. 5A-5F. Turning now to FIG. 4, at block 402, a start indicator for the next checkpoint generation is generated and written in the write ahead log 302 by the database management module 102. A checkpoint generation defines a period of time when transaction requests to the data storage system 100 are recorded in the write ahead log 302 before being implemented. This step is illustrated in FIG. 5A, where the start indicator for a checkpoint generation G11 is generated and inserted to the write ahead log 302 as "G11-S" immediately after the entry "G10-E", which is the end indicator for the previous checkpoint generation G10. As shown in FIG. 5A, the super blocks 304A and 304B include root node references of the COW $B^\varepsilon$-trees TREE1 and TREE2 with corresponding checkpoint generation identifiers. In this example, the COW $B^\varepsilon$-tree TREE1 includes a root node N1 and leaf nodes N2 and N3, and the COW $B^\varepsilon$-tree TREE2 includes a root node N4 and leaf nodes N5 and N6. As illustrated, the insert transaction requests I-0, I-1 and I-2 from the previous checkpoint generation G10 have been applied to the nodes N1, N2 and N3, respectively. Specifically, the super block 304A include root node references "TREE1-N1" and "TREE2-N4" and a checkpoint generation of G09. The super block 304B includes root node references "TREE1-N1" and "TREE2-N4" and a checkpoint generation of G10. Also in this example, the allocation bitmap 306A includes allocations for the checkpoint generation G09 and the allocation bitmap 306B includes allocations for the checkpoint generation G10. The in-memory allocation bitmap 306C is not shown in this FIG. 5A.

Next, at block 404, one or more transaction requests from the software processes 106 are received by the database management module 102 to be processed. Next, at block 406, a determination is made by the database management module 102 whether a condition for writing the transaction requests to the write ahead log 302 is satisfied. This condition may be satisfied when a group of transaction requests have been received by the database management module 102. Alternatively, the condition may be satisfied when a certain timeout has occurred, i.e., a prescribed amount of time has passed since the last transaction request was received by the database management module 102.

If the writing condition is not satisfied, the operation proceeds back to block 404, where additional transaction requests from the software processes 106 may be received by the database management module 102 to be processed until the condition is satisfied.

Figure 5B:
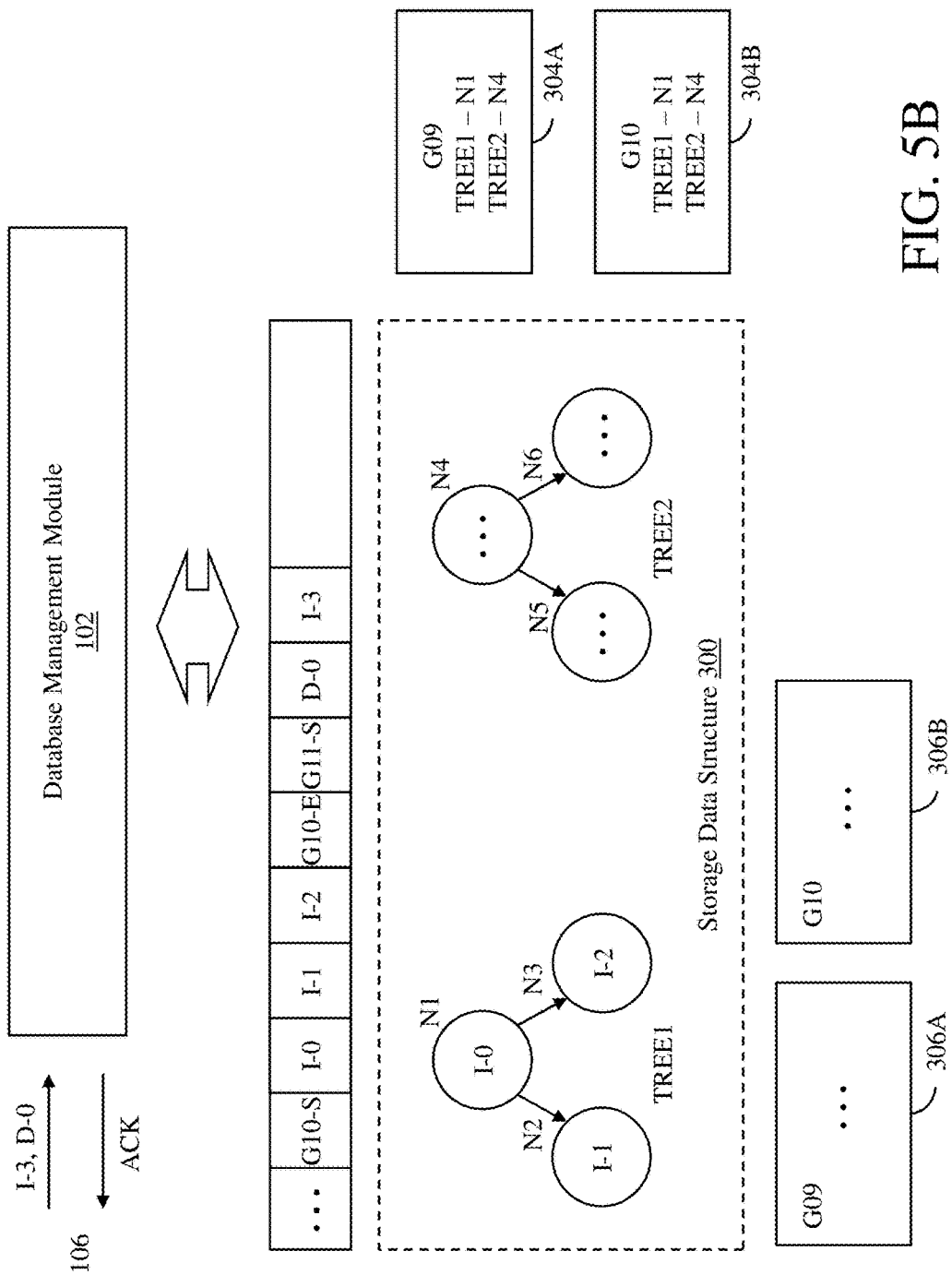

If the writing condition is satisfied, the operation proceeds to block 408, where the transaction requests are written to the write ahead log 302 in the order the transaction requests were received. Next, at block 410, messages are sent back to the software processes 106 to acknowledge that the transaction requests were received. These steps are illustrated in FIG. 5B, where a deletion transaction request D-0 and an insertion request I-3 are received and written to the write ahead log 302. In addition, acknowledgment messages are sent back to the software processes 106.

Next, at block 412, a determination is made whether a condition to initiate checkpointing is satisfied. This condition may be satisfied when the number of transaction requests in the write ahead log 302 exceeds a predefined threshold, which indicates that the write ahead log is sufficiently full. Alternatively, the condition may be satisfied when a predefined timeout has occurred, i.e., certain amount of time has passed since the completion of the last checkpointing process.

If the checkpointing condition is not satisfied, the operation proceeds back to block 404, where additional transaction requests from the software processes 106 may be received by the database management module 102 to be processed until the checkpointing condition is satisfied.

Figure 5C:
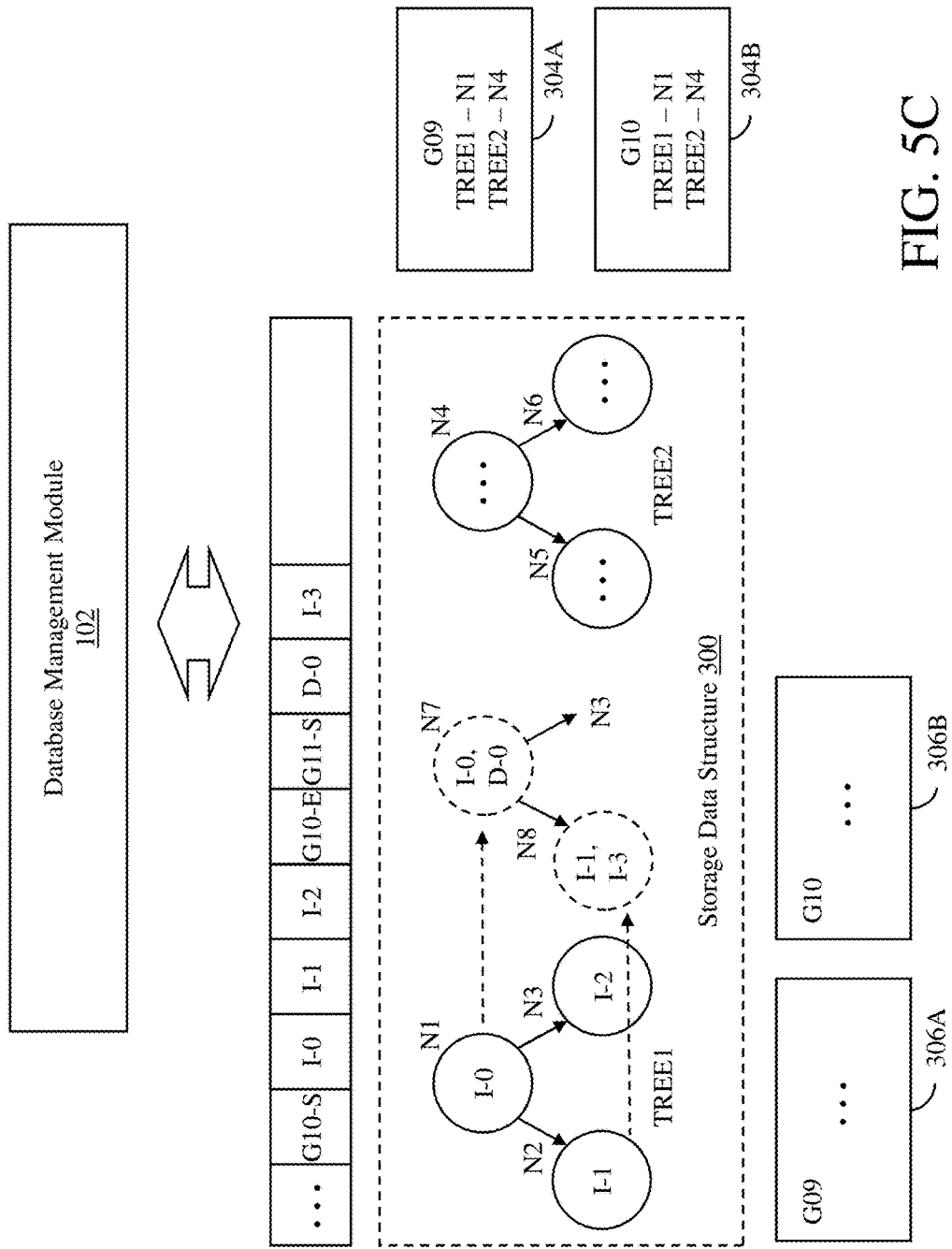

If the checkpointing condition is satisfied, the operation proceeds to block 414, where a group of transaction requests in the write ahead log 302 that were written after the start indicator of the current checkpoint generation are applied to the COW $B^\varepsilon$-trees of the storage data structure 300 by the database management module 102. In an embodiment, the database management module 102 uses memory to make changes to the storage data structure 300. After the changes are made, a flushing process is initiated by the database management module 102, which copy-on-writes all dirty pages during the flushing process. As a result, a copy of one or more root nodes of COW $B^\varepsilon$-trees of the storage data structure 300 may be created and modified accordingly. These steps are illustrated in FIG. 5C, where the deletion transaction request D-0 and the insertion transaction request I-3 are applied to the storage data structure 300, which creates a new root node for the COW $B^\varepsilon$-tree TREE1. As shown in FIG. 5C, a new root node N7 has been created for the COW $B^\varepsilon$-tree TREE1 due to the deletion transaction request D-0. In addition, a new leaf node N8 has been created for the COW $B^\varepsilon$-tree TREE1 due to the insertion transaction request I-3. It is noted here that the new root node N7 points to the leaf node N3 since the leaf node N3 has not been changed.

Next, at block 416, a determination is made by the database management module 102 whether one or more new root nodes have been created for the COW $B^\varepsilon$-trees of the storage data structure 300 due to the transaction requests in the write ahead log 302 being applied to the storage data structure.

If one or more new root nodes have not been created for the COW $B^\varepsilon$-trees of the storage data structure 300, the operation proceeds to block 420.

Figure 5D:
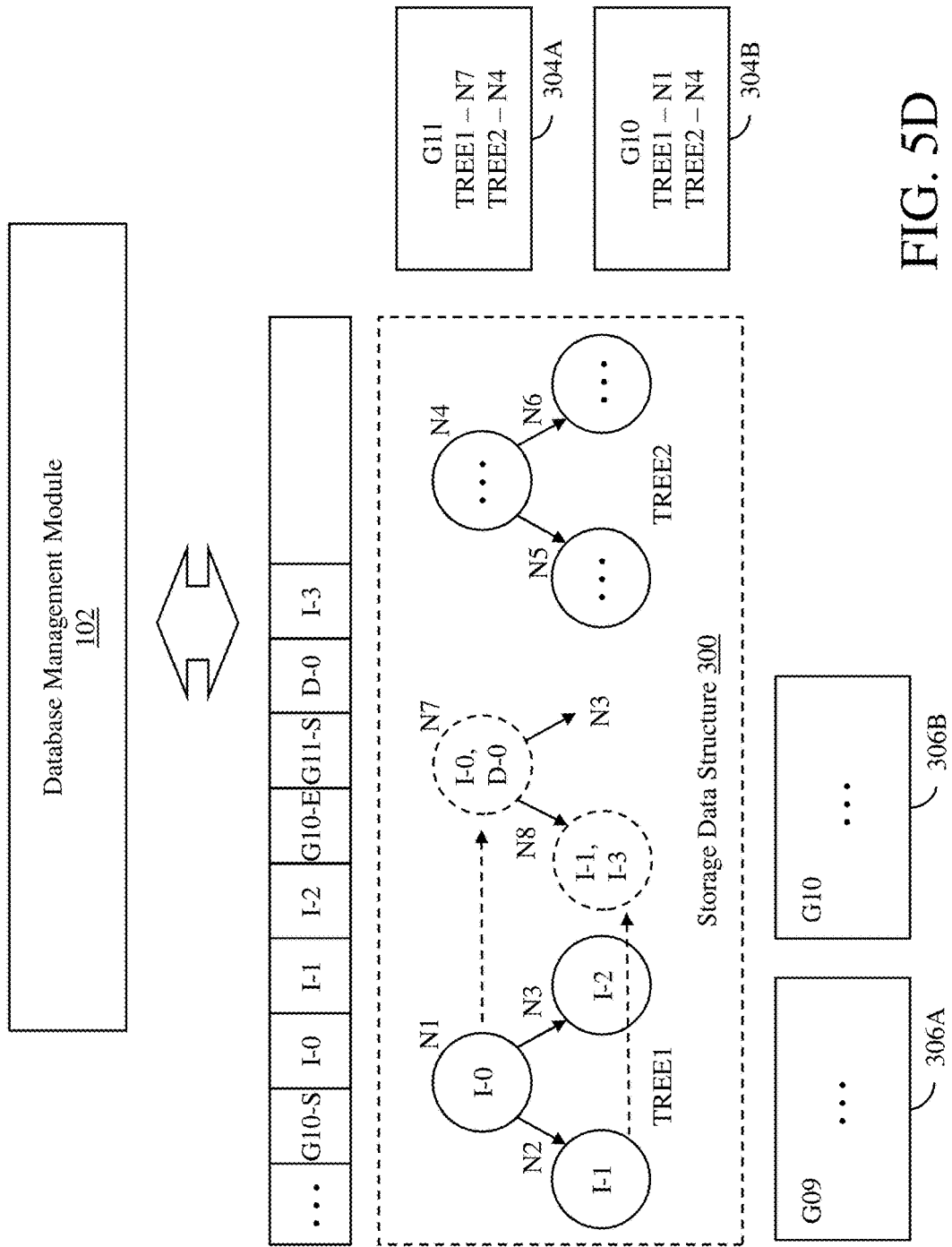

If one or more new root nodes have been created for the COW $B^\varepsilon$-trees of the storage data structure 300, the operation proceeds to block 418, where one of the super blocks 304A and 304B is updated with references to the new root nodes of the COW $B^\varepsilon$-trees of the storage data structure 300 by the database management module 102. In addition, an identifier for the current checkpoint generation is added to the updated super block by the database management module 102. A checksum may also be computed and added to the updated super block by the database management module 102. In an embodiment, the most recently updated super block at a first storage location in the storage system 104 is used to make changes in memory to reflect any reference changes to the root nodes of the COW $B^\varepsilon$-trees of the storage data structure 300. The modified super block in memory is then used to replace the other super block at a second storage location in the storage system 104. When the super blocks need to be updated again during a subsequent checkpointing process, the super block at the second storage location, which would now be the most recently updated super block, is used to make changes to replace the super block at the first storage location. In this fashion, the two super blocks 304A and 304B are updated in an alternating manner. The super block updating step is illustrated in FIG. 5D, where the super block 304A has been updated to reflect the new root node for the COW $B^\varepsilon$-tree TREE1. Thus, the super block 304A include root node references "TREE1-N7" and "TREE2-N4" and a checkpoint generation identifier of G11.

Next, at block 420, the in-memory allocation bitmap 306C is modified by the database management module 102 to reflect changes in storage allocations due to the transaction requests that are being checkpointed, such as allocating new blocks or freeing previously allocated blocks in the storage system 104. In addition, the current checkpoint generation identifier is added to the in-memory allocation bitmap 306C.

Next, at block 422, the modified in-memory allocation bitmap 306C is written to the storage system 104, e.g., on disk, by the database management module 102 to replace the oldest allocation bitmap from the two allocation bitmaps 306A and 306B in the storage system. In an embodiment, the oldest allocation bitmap selected from the two allocation bitmaps 306A and 306B may be overwritten with the modified in-memory allocation bitmap 306C. For the next checkpointing process, the other allocation bitmap stored in the storage system 104 will be overwritten with the in-memory allocation bitmap 306C. Thus, the two allocation bitmaps 306A and 306B in the storage system 104 are updated in an alternating fashion for successive checkpointing processes.

Figure 5E:
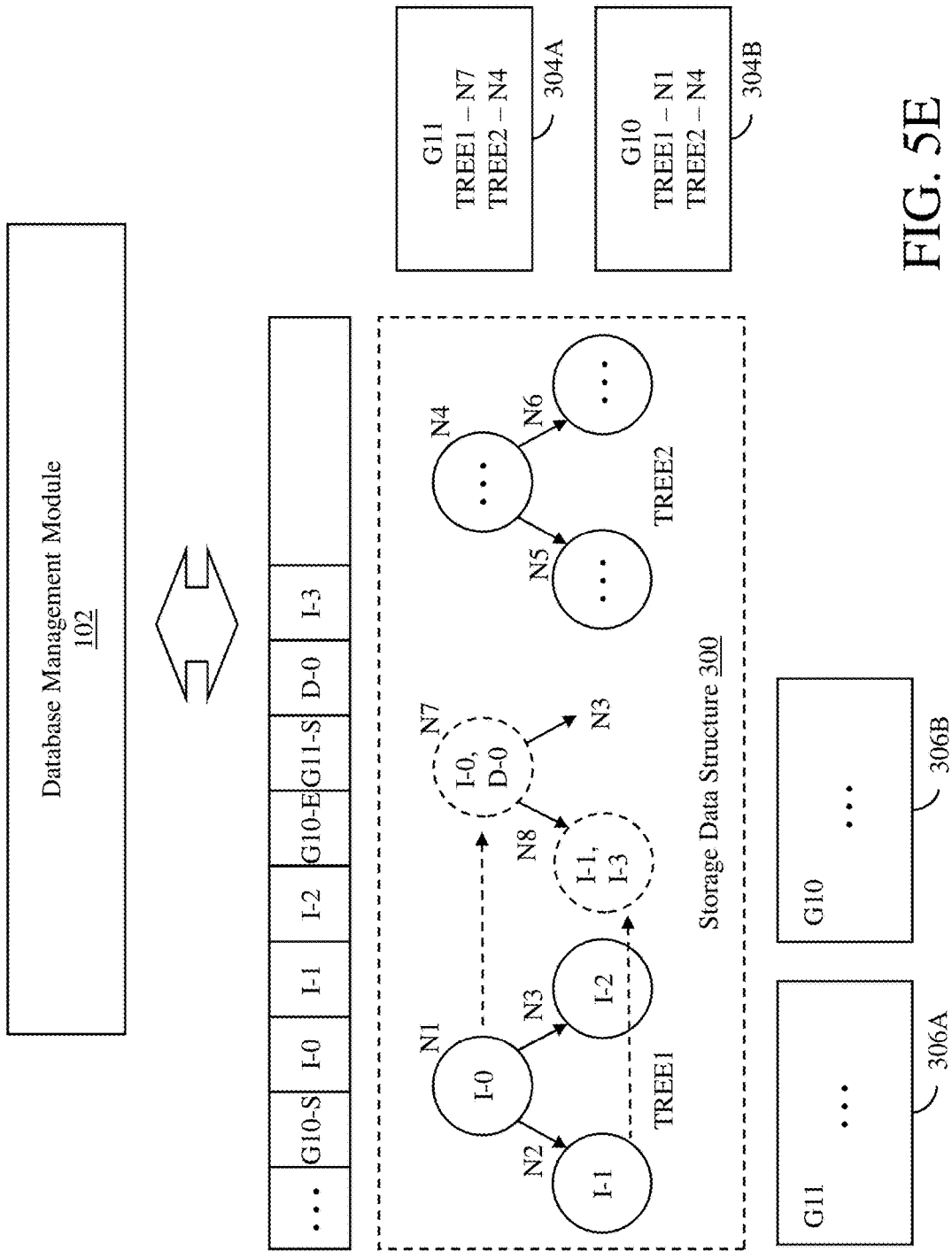

The allocation bitmap updating step is illustrated in FIG. 5E, where the oldest allocation bitmap 306A has been updated to reflect changes in storage allocations for the current checkpointing process using the checkpoint generation identifier of G11.

Figure 5F:
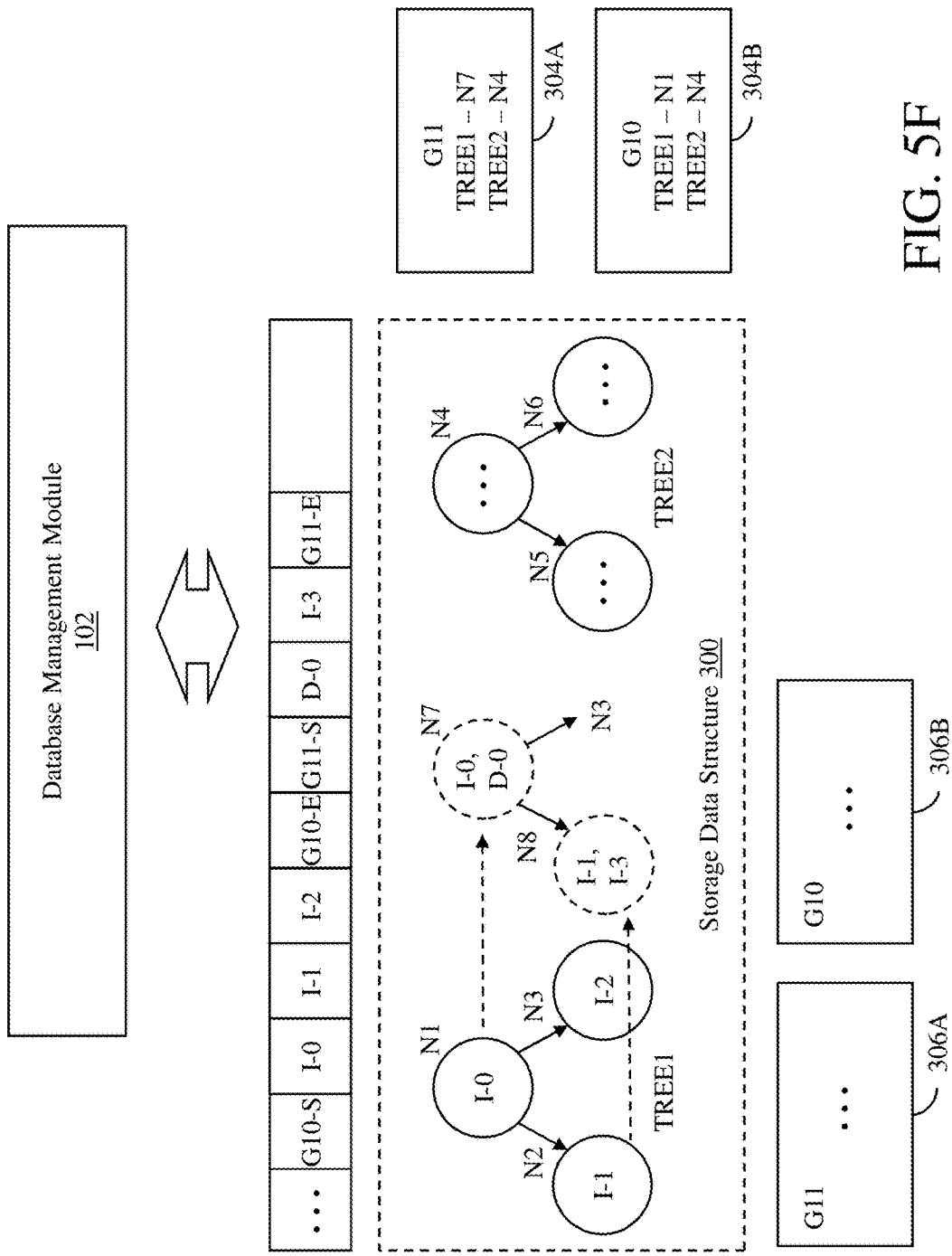

Next, at block 424, an end indicator for the current checkpoint generation is generated and written in the write ahead log 302 to indicate that the storage data structure 300, the super blocks 304A and 304B and the allocation bitmaps 306A and 306B have been updated. Thus, the end indicator for a particular checkpoint generation in the write ahead log 302 shows that the checkpointing process for that particular checkpoint generation has been properly completed. This step is illustrated in FIG. 5F, where the end indicator for the current checkpoint generation G11 is generated and inserted to the write ahead log 302 as "G11-E". In one embodiment, the location of the end indicator is periodically written to the header of the log to speed up the search of the last valid end indicator in the log during recovery.

The operation then proceeds back to block 402, where a start indicator for the next checkpoint generation is written to the write ahead log 302 to indicate the start of a new checkpoint generation. In one embodiment, the start indicator for the next checkpoint is written together with the end indicator of the previous checkpoint to reduce the number of I/Os to the write ahead log 302. The use of the write ahead log 302, the super blocks 304A and 304B and the allocation bitmaps 306A and 306B allows the storage data system 100 to properly recover from a failure so that operations executed or being executed at the time of the failure are reflected in the storage data system after the recovery.

Figure 6:
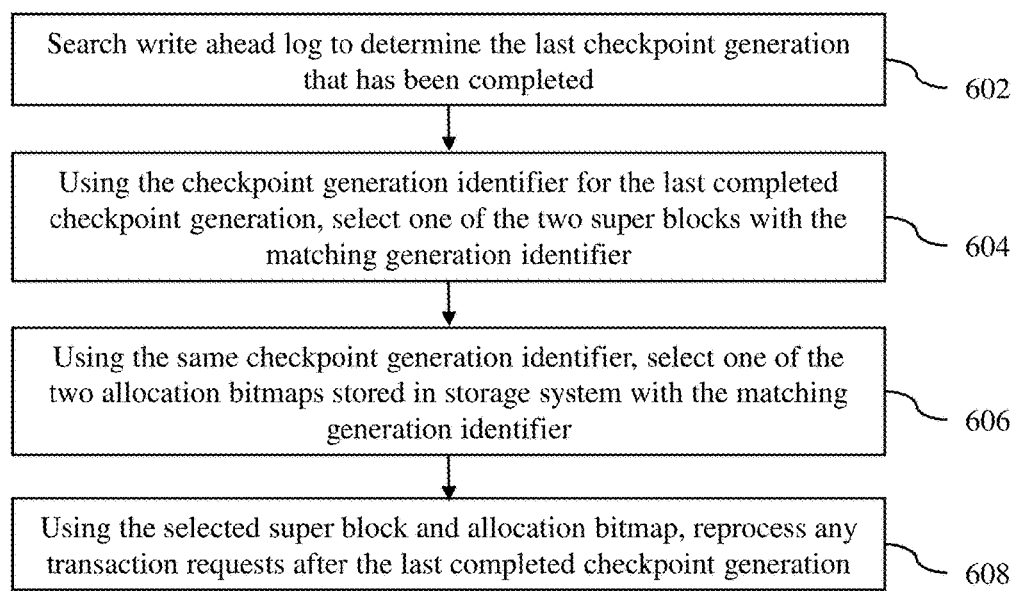
FIG. 6 is a process flow diagram of the recovery operation of the data storage system in accordance with an embodiment of the invention.
Figure 7:
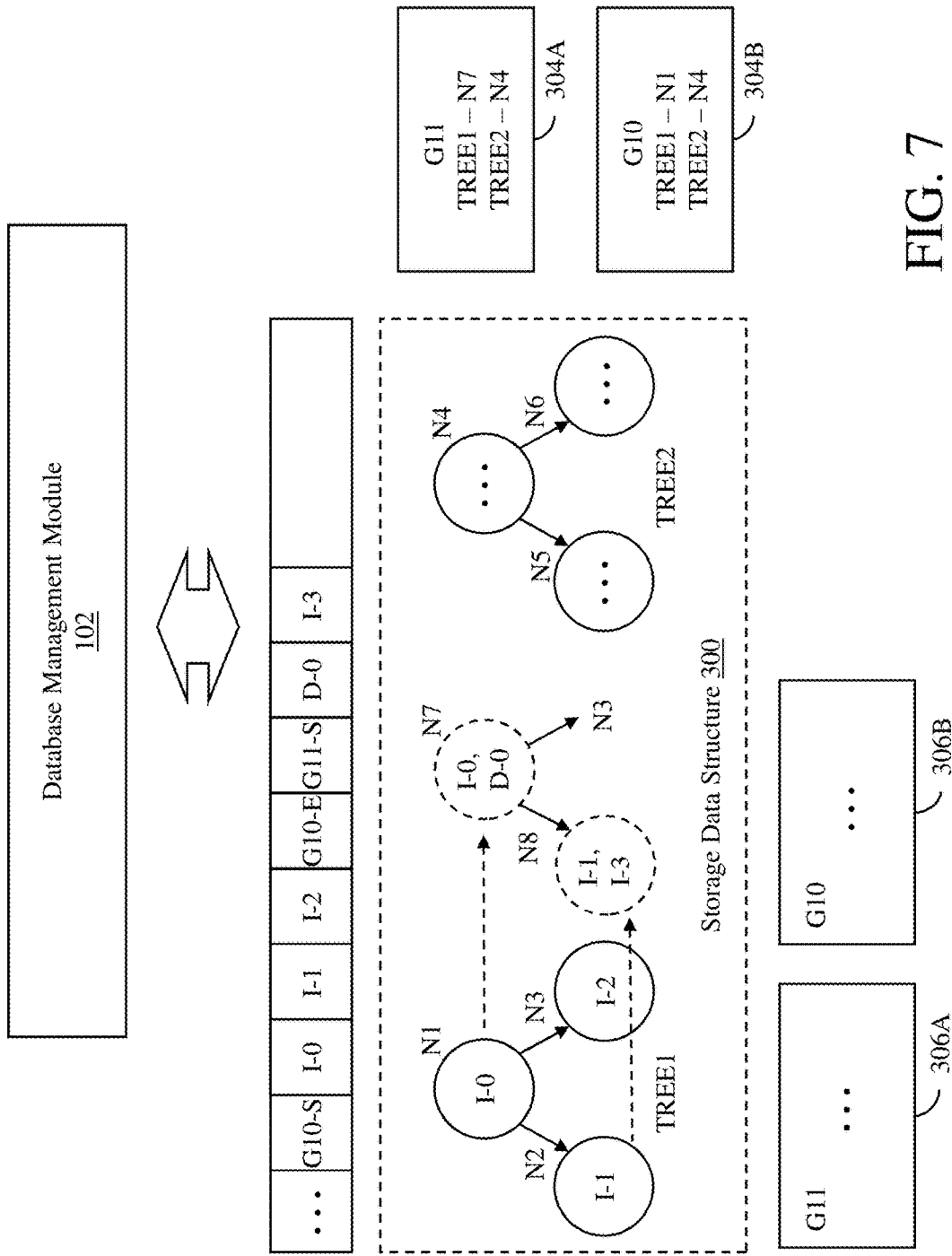
FIG. 7 shows an example of data structures used by the data storage system at a moment of a failure in accordance with an embodiment of the invention.

The recovery operation of the data storage system 100 in the event of a failure in accordance with an embodiment of the invention will now be described with reference to a flow diagram of FIG. 6 using an example of data structures used by the data storage system at a moment of the failure, which is shown in FIG. 7.

Turning now to FIG. 6, at block 602, after a failure event, e.g., a system crash, the write ahead log 302 is searched by the database management module 102 to determine the last checkpoint generation that has been completed. A checkpoint generation has been completed if there is an end indicator for that checkpoint generation. Thus, in an embodiment, the database management module 102 will search through the write ahead log 302 to find the most recent end indicator for a checkpoint generation in the write ahead log. This step is illustrated in FIG. 7, which shows the state of the storage data structure 300, the write ahead log 302, the super blocks 304A and 304B and the allocation bitmaps 306A and 306B right before the end indicator for the checkpoint generation G11 or "G11-E" has been added to the write ahead log. In this state, the last checkpoint generation that has been completed is the checkpoint generation G10 because the end indicator for the checkpoint generation G10 is present in the write ahead log 302 as "G10-E".

Next, at block 604, using the checkpoint generation identifier for the last completed checkpoint generation, one of the super blocks 304A and 304B with the matching generation identifier is selected by the database management module 102. In the example shown in FIG. 7, the super block 304B will be selected since the checkpoint generation identifier "G10" is stored in that super block. In some embodiments, the checksums in the super blocks 304A and 304B are checked to verify data integrity. If the checksum in one of the super blocks 304A and 304B cannot be validated, the other super block may be selected, which would involve going back to the checkpoint generation preceding the last completed checkpoint generation.

Next, at block 606, using the same checkpoint generation identifier, one of the allocation bitmaps 306A and 306B stored in the storage system 104 with the matching generation identifier is selected by the database management module 102. In the example shown in FIG. 7, the allocation bitmap 306B will be selected since the checkpoint generation identifier "G10" is stored in that allocation bitmap.

Next, at block 608, using the selected super block and allocation bitmap, any transaction requests after the last completed checkpoint generation are reprocessed by the database management module 102. The reprocessing of transaction requests may involve undoing incomplete transaction requests and then processing those transaction requests as if the transaction requests are new transaction requests. This ensures that the state of the storage data structure 300, the write ahead log 302, the super blocks 304A and 304B and the allocation bitmaps 306A and 306B is restored as close as possible to the moment of the failure event. In the example shown in FIG. 7, the super block 304B and the allocation bitmap 306B will be used by the database management module 102 to reprocess the delete operation D-0 and the insert operation I-3, which are the operations that were received after the last completed checkpoint generation G10.

However, if a super block is selected that has been updated for a previous completed checkpoint generation, all transactions after that previous completed checkpoint generation are reprocessed.

It is noted here that whether the super block 304A has been updated for the checkpoint generation G11 does not affect the recovery operation since the super block 304B is used for the recovery. Similarly, whether the allocation bitmap 304A has been updated for the checkpoint generation G11 does not affect the recovery operation since the allocation bitmap 306B is used for the recovery.

It is also noted here that if the super block 304B is not accessible due to some failure, the super block 304A would be used to reprocess some of the operations stored as transaction requests in the write ahead log 302. In this scenario, all the operations after the checkpoint generation G09 would need to be reprocessed using the super block 304A and the allocation bitmap 306A or 306B. Similarly, if the allocation bitmap 306B is not accessible due to some failure, the allocation bitmap 306A would be used to reprocess some of the operations stored as transaction requests in the write ahead log 302. In this scenario, all the operations after the checkpoint generation G09 would need to be reprocessed using the allocation bitmap 306A and the super block 304A or 304B.

Figure 8:
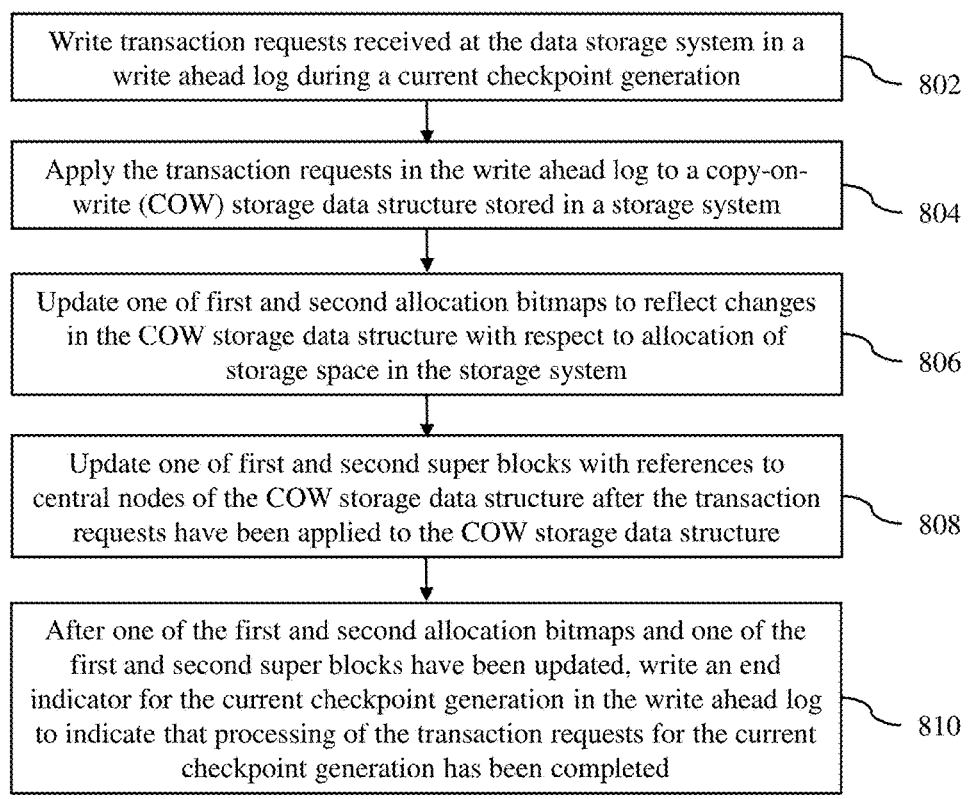
FIG. 8 is a flow diagram of a method of managing transaction requests to a data storage system in accordance with an embodiment of the invention.

A method for managing transaction requests to a data storage system in accordance with an embodiment of the invention is described with reference to a flow diagram of FIG. 8. At block 802, transaction requests received at the data storage system during a current checkpoint generation are written in a write ahead log. Next, at block 804, the transaction requests in the write ahead log are applied to a copy-on-write (COW) storage data structure stored in a storage system. Next, at block 806, one of first and second allocation bitmaps is updated to reflect changes in the COW storage data structure with respect to allocation of storage space in the storage system. Next, at block 808, one of first and second super blocks is updated with references to central nodes of the COW storage data structure after the transaction requests have been applied to the COW storage data structure. Next, at block 810, after one of the first and second allocation bitmaps and one of the first and second super blocks have been updated, an end indicator for the current checkpoint generation is written in the write ahead log to indicate that processing of the transaction requests for the current checkpoint generation has been completed.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing transaction requests to a data storage system, the method comprising:
    writing transaction requests received at the data storage system during a current checkpoint generation in a write ahead log;
    applying the transaction requests in the write ahead log to a copy-on-write (COW) storage data structure stored in a storage system;
    updating one of first and second allocation bitmaps to reflect changes in the COW storage data structure with respect to allocation of storage space in the storage system, wherein the other allocation bitmap of the first and second allocation bitmaps is updated during a subsequent checkpointing process;
    updating one of first and second super blocks with references to central nodes of the COW storage data structure after the transaction requests have been applied to the COW storage data structure, wherein the other super block of the first and second super blocks is updated during the subsequent checkpointing process; and
    after one of the first and second allocation bitmaps and one of the first and second super blocks have been updated, writing an end indicator for the current checkpoint generation in the write ahead log to indicate that processing of the transaction requests for the current checkpoint generation has been completed.

2. The method of claim 1, further comprising, before writing the transaction requests in the write ahead log, writing a start indicator for the current checkpoint generation in the write ahead log.

3. The method of claim 2, wherein updating one of the first and second allocation bitmaps includes modifying an in-memory allocation bitmap to reflect the changes in the COW storage data structure and replacing the oldest allocation bitmap selected from the first and second allocation bitmaps with the in-memory allocation bitmap.

4. The method of claim 3, further comprising adding a checkpoint generation identifier of the current checkpoint generation to one of the first and second allocation bitmaps that has been updated.

5. The method of claim 1, wherein the COW storage data structure stored in the storage system includes B-trees, and wherein updating one of the first and second super blocks includes updating one of the first and second super blocks with references to root nodes of the B-trees in the COW storage data structure after the transaction requests have been applied to the COW storage data structure.

6. The method of claim 5, wherein the B-trees are $B^\epsilon$-trees, and wherein updating one of the first and second super blocks includes updating one of the first and second super blocks with references to root nodes of the $B^\epsilon$-trees in the COW storage data structure.

7. The method of claim 5, further comprising adding a checkpoint generation identifier of the current checkpoint generation to one of the first and second super blocks that has been updated.

8. The method of claim 1, further comprising:
    after a failure, searching the write ahead log to determine the last completed checkpoint generation;
    selecting one of the first and second allocation bitmaps with a checkpoint generation identifier for the last completed checkpoint generation;
    selecting one of the first and second super blocks with the checkpoint generation identifier for the last completed checkpoint generation; and
    using the selected allocation bitmap and the selected super block, reprocessing transaction requests in the write ahead log written after the last completed checkpoint generation.

9. A non-transitory computer-readable storage medium containing program instructions for managing transaction requests to a data storage system, wherein execution of the program instructions by one or more processors of a computer system causes the one or more processors to perform steps comprising:
    writing transaction requests received at the data storage system during a current checkpoint generation in a write ahead log;

applying the transaction requests in the write ahead log to a copy-on-write (COW) storage data structure stored in a storage system;
updating one of first and second allocation bitmaps to reflect changes in the COW storage data structure with respect to allocation of storage space in the storage system, wherein the other allocation bitmap of the first and second allocation bitmaps is updated during a subsequent checkpointing process;
updating one of first and second super blocks with references to central nodes of the COW storage data structure after the transaction requests have been applied to the COW storage data structure, wherein the other super block of the first and second super blocks is updated during the subsequent checkpointing process; and
after one of the first and second allocation bitmaps and one of the first and second super blocks have been updated, writing an end indicator for the current checkpoint generation in the write ahead log to indicate that processing of the transaction requests for the current checkpoint generation has been completed.

10. The computer-readable storage medium of claim 9, wherein the steps further comprise, before writing the transaction requests in the write ahead log, writing a start indicator for the current checkpoint generation in the write ahead log.

11. The computer-readable storage medium of claim 10, wherein updating one of the first and second allocation bitmaps includes modifying an in-memory allocation bitmap to reflect the changes in the COW storage data structure and replacing the oldest allocation bitmap selected from the first and second allocation bitmaps with the in-memory allocation bitmap.

12. The computer-readable storage medium of claim 11, wherein the steps further comprise adding a checkpoint generation identifier of the current checkpoint generation to one of the first and second allocation bitmaps that has been updated.

13. The computer-readable storage medium of claim 9, wherein the COW storage data structure stored in the storage system includes B-trees, and wherein updating one of the first and second super blocks includes updating one of the first and second super blocks with references to root nodes of the B-trees in the COW storage data structure after the transaction requests have been applied to the COW storage data structure.

14. The computer-readable storage medium of claim 13, wherein the B-trees are $B^\varepsilon$-trees, and wherein updating one of the first and second super blocks includes updating one of the first and second super blocks with references to root nodes of the $B^\varepsilon$-trees in the COW storage data structure.

15. The computer-readable storage medium of claim 13, wherein the steps further comprise adding a checkpoint generation identifier of the current checkpoint generation to one of the first and second super blocks that has been updated.

16. The computer-readable storage medium of claim 9, wherein the steps further comprise:
after a failure, searching the write ahead log to determine the last completed checkpoint generation;
selecting one of the first and second allocation bitmaps with a checkpoint generation identifier for the last completed checkpoint generation;
selecting one of the first and second super blocks with the checkpoint generation identifier for the last completed checkpoint generation; and
using the selected allocation bitmap and the selected super block, reprocessing transaction requests in the write ahead log written after the last completed checkpoint generation.

17. A data storage system comprising:
memory; and
a processor configured to:
write transaction requests received at the data storage system during a current checkpoint generation in a write ahead log;
apply the transaction requests in the write ahead log to a copy-on-write (COW) storage data structure stored in a storage system;
update one of first and second allocation bitmaps to reflect changes in the COW storage data structure with respect to allocation of storage space in the storage system, wherein the other allocation bitmap of the first and second allocation bitmaps is updated during a subsequent checkpointing process;
update one of first and second super blocks with references to central nodes of the COW storage data structure after the transaction requests have been applied to the COW storage data structure, wherein the other super block of the first and second super blocks is updated during the subsequent checkpointing process; and
after one of the first and second allocation bitmaps and one of the first and second super blocks have been updated, write an end indicator for the current checkpoint generation in the write ahead log to indicate that processing of the transaction requests for the current checkpoint generation has been completed.

18. The data storage system of claim 17, wherein the processor is configured to modify an in-memory allocation bitmap to reflect the changes in the COW storage data structure and replace the oldest allocation bitmap selected from the first and second allocation bitmaps with the in-memory allocation bitmap.

19. The data storage system of claim 17, wherein the COW storage data structure stored in the storage system includes B-trees, and wherein the processor is configured to update one of the first and second super blocks with references to root nodes of the B-trees in the COW storage data structure after the transaction requests have been applied to the COW storage data structure.

20. The data storage system of claim 17, wherein the processor is configured to:
after a failure, search the write ahead log to determine the last completed checkpoint generation;
select one of the first and second allocation bitmaps with a checkpoint generation identifier for the last completed checkpoint generation;
select one of the first and second super blocks with the checkpoint generation identifier for the last completed checkpoint generation; and
using the selected allocation bitmap and the selected super block, reprocess transaction requests in the write ahead log written after the last completed checkpoint generation.

* * * * *